Figure 1:
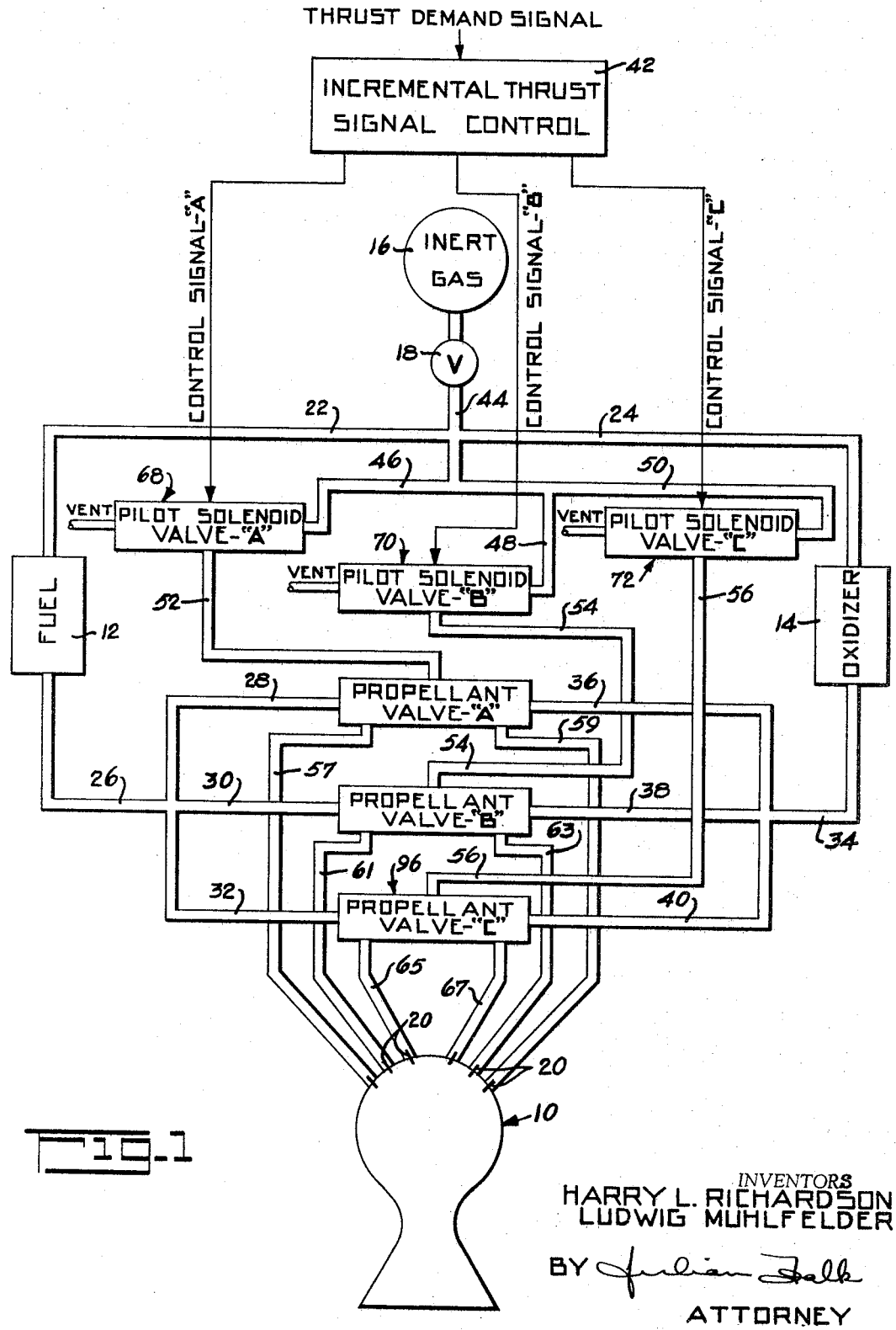

March 14, 1967  H. L. RICHARDSON ETAL  3,308,619
INCREMENTAL THRUST CONTROL SYSTEM
Filed May 14, 1965  2 Sheets-Sheet 1

INVENTORS
HARRY L. RICHARDSON
LUDWIG MUHLFELDER
BY Julian Falk
ATTORNEY

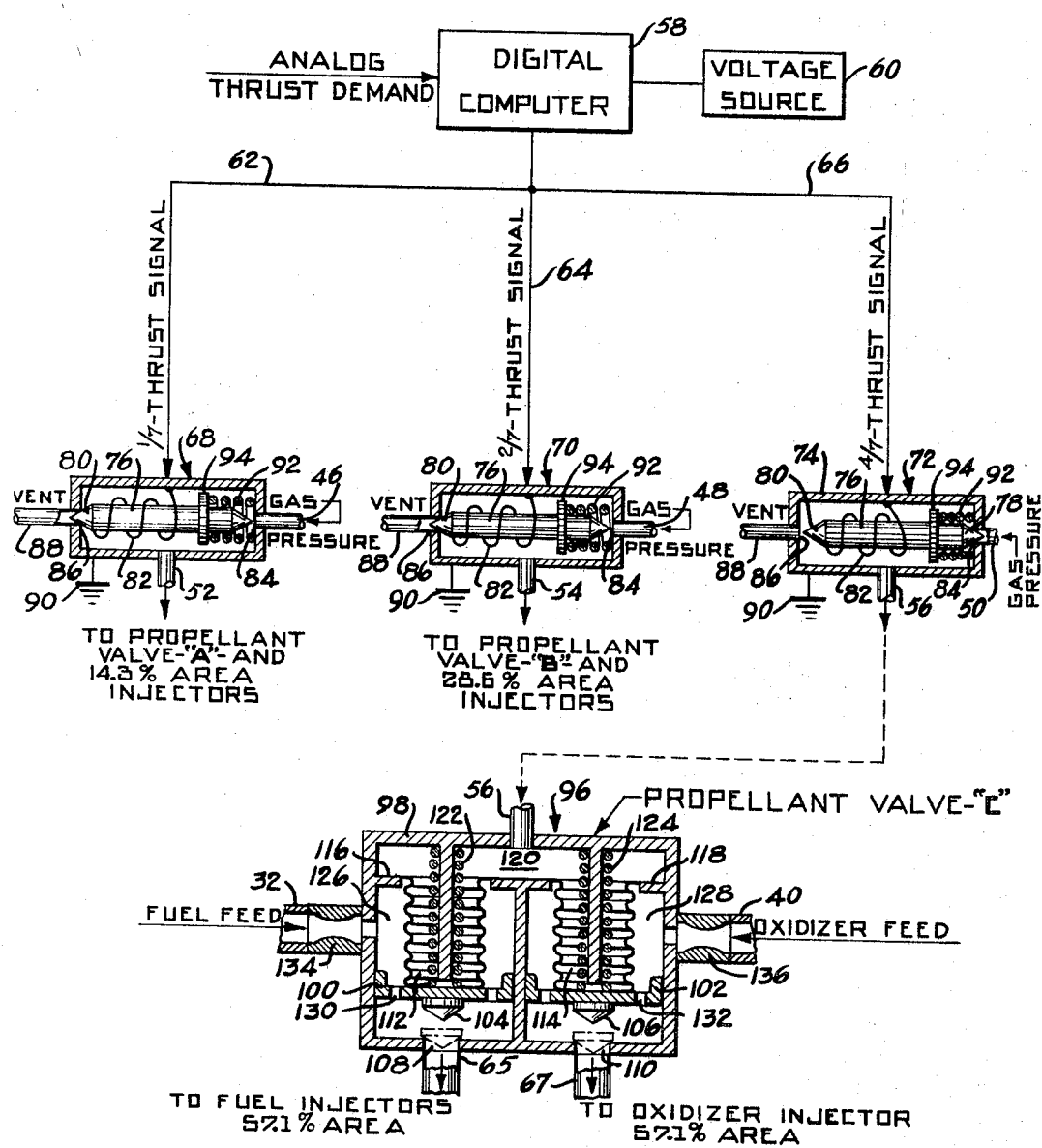

United States Patent Office 3,308,619
Patented Mar. 14, 1967

3,308,619
INCREMENTAL THRUST CONTROL SYSTEM
Harry L. Richardson, River Edge, and Ludwig Muhlfelder, Livingston, N.J., assignors to Curtiss-Wright Corporation
Filed May 14, 1965, Ser. No. 455,802
9 Claims. (Cl. 60—39.27)

The invention described herein was made in the performance of work under a NASA contract and is subject to the provisions of the National Aeronautics Space Act of 1958, Public Law 85–568 (72 Stat. 426; 42 U.S.C. 2451), as amended.

This invention is directed to a thrust control system for rocket engines or the like and is particularly directed to an incremental or step-by-step system for varying the thrust thereof as opposed to a continuously variable system.

It has been generally known to vary the thrust of rocket engines or the like in a continuous method. By continuous method it is meant herein, for example, that method similarly used in applying the accelerator pedal of an automobile. In the continuously variable systems the changes in thrust are normally brought about through varying the area of an annular flow orifice by a pintle-type or needle-type valve member moving relative to said annular flow orifice. The continuously variable type systems have suffered from some disadvantages in that they are sensitive to dirt which may change the variable annular flow orifice area, they require complex control systems including feed-back controls and may be relatively unstable. The present invention provides a system which makes use of relatively simple and reliable on-off valves which are controlled by a small solid state switching circuit which responds to a proportional demand signal and selects a proper combination of valves to match the desired thrust level. The system is relatively simple, does not require any feed-back controls, is insensitive to dirt and is extremely stable and highly accurate in controlling the thrust level and propellant mixture ratio.

The invention is generally carried out by first converting an analog thrust demand signal into a digital form which signal may be transmitted as a finite voltage to activate a solenoid valve which will re-act to open or close for permitting fluid to flow through an orifice of predetermined size. By utilizing singly or in combination a number of pairs of flow orifices conveniently staggered in size, different increments or levels of fluid flow can be obtained. It has been found that a number of obtainable levels of thrust output is equal to, two (2) raised to the power equal to the number of solenoid valves minus one (1), $(2^n-1)$. Thus, by varying the number of valves and suitably staggering them according to size, variations in the number of attainable thrust levels can be obtained, as desired.

Accordingly, it is one object of the invention to provide a novel and improved thrust control system for rocket engines and the like.

It is another object of the invention to provide a novel incremental fluid flow control system for energy converting mechanisms whose output is directly related to the input flow rate.

It is a further object of the invention to provide a relatively simple, highly accurate and reliable thrust control system for rocket engines or the like.

It is an additional object of the invention to provide a novel incremental liquid flow control device through which flow of the liquid can be accurately controlled for obtaining variations in the rate of flow thereof.

Other objects and advantages of the invention will be best understood upon reading the following detailed description with the accompanying drawings wherein:

FIG. 1 illustrates a typical layout for a jet engine or rocket engine propellant system including the incremental flow control system of the invention; and FIG. 2 shows a portion of the control system of FIG. 1 with parts thereof shown in section and enlarged for purposes of illustration.

Referring to the drawings, a control system for regulating the flow of propellants to a rocket motor 10 is illustrated therein which thus controls the thrust output of said rocket motor 10. It will be apparent, however, that the invention is not limited to thrust control devices for rocket motors alone but is applicable also to other type engines or more broadly to any application wherein control of the amount of flow of a liquid is desired such as, for example, fuel flow or hydraulic controls for use in aircraft. The fuels, which in this case are preferably hypergolic propellants, are supplied to the rocket motor 10 from the fuel storage tank 12 and an oxidizer storage tank 14 which are pressurized by gas from a storage tank 16 containing an inert gas, the flow of which is controlled by a valve 18 in a known manner. The propellants are injected into the combustion chamber of the rocket motor 10 through suitable injectors 20, diagrammatically illustrated in FIG. 1. The supply of the propellants to the rocket motor 10 thus far described is conventional.

As is also well known, the thrust output of a rocket motor is proportional to the weight flow of the propellants supplied to said rocket motor. In accordance with the invention, the weight flow of propellant supplied to the rocket motor 10 is controlled in a step-by-step fashion so that there may be said to be a plurality of fixed thrust levels wherein a fixed amount of the propellants is supplied to the combustion chamber of the rocket motor 10 for a respective fixed thrust level. As explained above, the fuel and oxidizer are forced out of the respective storage tanks 12 and 14 by an inert gas from the gas storage tank 16 supplied through lines 22 and 24 respectively to the tanks 12 and 14. The fuel supplied from the fuel storage tank 12 passes from such storage tank through a line 26 which in turn supplies three branch fuel lines 28, 30 and 32 each respectively conveying the fuel to one side of propellant valves A, B and C (FIG. 1).

As illustrated in FIG. 1, the branch line 28 supplies one side of the propellant valve A, line 30 supplies one side of the propellant valve B and line 32 supplies one side of the propellant valve C. Likewise, line 34 supplies oxidizer to branch lines 36, 38 and 40 which in turn supply oxidizer to the other side of propellant valves A, B, and C. As will be explained hereinafter, the propellant valves A, B, and C are on-off type valves which may be selectively operated in accordance with a thrust demand signal. The propellant valve A has two discharge lines 57 and 59 which respectively supply the fuel and oxidizer separately to the injectors 20 in the rocket motor 10. Likewise, propellant valve B has discharge lines 61 and 63 and propellant valve C has discharge lines 65 and 67 which respectively supply the fuel and oxidizer to injectors 20 connected with the respective lines from the valves B and C.

In order to selectively control the propellant valves A, B and C, pilot solenoid valves A, B and C are respectively connected to each of said propellant valves, as will be explained hereinafter. As shown in FIG. 1, an incremental thrust signal control center 42 is provided which converts an analog thrust demand signal, shown as an input in FIG. 1, into output digital control signals including, a control signal A, a control signal B and a control signal C depending upon the thrust level called for by the analog thrust demand signal. The respective control signals A, B or C are connected to the pilot solenoid valves A, B and C so that these valves are controlled by a signal from the incremental thrust signal control 42 in accordance with the analog demand signal input. Each of the pilot solenoid valves A, B and C is connected to the gas storage tank 16 through the valve 18 and a connecting line 44 which in turn is connected to branch lines 46, 48 and 50 respectively connected to one side of the pilot solenoid valves A, B and C. The pilot solenoid valves A, B and C are provided with gas discharge lines 52, 54 and 56 which are respectively connected to the propellant valves A, B and C, as illustrated. Vent lines are provided on the opposite side of each of the pilot solenoid valves, as shown in FIGS. 1 and 2.

Referring to FIG. 2, wherein the components are more specifically illustrated, the incremental thrust signal control center 42 of FIG. 1 may comprise a digital computer 58 having a suitable voltage source 60 connected thereto for powering said computer. The computer 58 may be of a well known type which converts an analog thrust demand signal to a digital output signal which is proportional to the input signal of the analog thrust demand. This switching circuit consists of standard solid state bistable electronic modules which are insensitive to variations in temperature or component degradation. It is to be understood that conventional solid state switching circuits may be used in the invention and that no invention is alleged in the circuitry itself.

As further illustrated in FIG. 2, three output signals 62, 64 and 66 which respectively provide signals equal to one-seventh of the total thrust output, two-sevenths of the total thrust output, four-sevenths of the total thrust output or in combination a 100% thrust output signal. Each of the lines of the computer 62, 64 and 66 is respectively connected to one of the pilot solenoid valves illustrated in FIG. 2 at 68, 70 and 72. Each of the pilot solenoid valves 68, 70 and 72 may be identical and for purposes of description the valve 72 will now be described. The pilot solenoid valve 72 includes an outer housing 74 which contains a solenoid valve armature 76 having needle-type valve heads 78 and 80 at each end thereof. A coil 82 connected to the thrust input signal 66 is wound around the solenoid valve armature 76 so that when a current is induced in the coil 82 the armature 76 will be forced to the right, as illustrated in FIG. 2, wherein the valve head 78 will close an opening 84 in the outer housing 74 and therefore close off the gas pressure from the line 50. An opening 86 is provided in the opposite end of the housing 74 which opening 86 is connected to a vent 88 for venting the pressure from the line 56, as will be explained in greater detail below. A suitable ground 90 is also provided to complete the circuit for the solenoid valve. A spring 92 is disposed between the housing 74 and a flange portion 94 on the armature 76 which spring normally biases the armature 76 so that the opening 84 is not blocked by the valve head 78 whereby the gas pressure in line 50 communicates with the line 56. The spring 92 normally biases the armature 76 towards the left as shown by pilot valves 68 and 70 in FIG. 2, so that the armature 76 will close the opening 86 to the vent pipe 88.

As explained above in relation to FIG. 1, the gas discharge line 56 from the pilot solenoid valve 72 is connected to the propellant valve C, there being a similar propellant valve connected to each of the pilot solenoid valves 68 and 70 as illustrated in FIG. 1. Only one propellant valve is shown in FIG. 2 for purposes of illustration that being propellant valve C and indicated at 96. The propellant valve 96 comprises a housing 98 containing two piston-type valve members 100 and 102 there being one for the fuel supply and one for the oxidizer supply, respectively. The valve pistons 100 and 102 each have a valve head 104 and 106, respectively, which open or close an opening 108 or 110, respectively, in the valve housing 98. Each of the valve members 100 and 102 has a bellows 112 and 114 respectively connected thereto at one end thereof and at its other end to flange portions 116 and 118 in the interior of the valve housing 98. As can be seen in FIG. 2, the interior of the propellant valve housing 98 between the bellows 112 and 114, the valve members 100 and 102, and the radially upper interior portion of said housing 98 defines a closed chamber 120 to which gas pressure from the line 56 may be supplied or discharged. Springs 122 and 124 are connected to the valve members 100 and 102 respectively, which springs normally bias said valve members to a closed position as illustrated in FIG. 2. As explained above, a fuel feed line 32 is connected to one side of the propellant valve 96 and an oxidizer feed line 40 is connected to the opposite side of said propellant valve. The fuel and oxidizer lines 32 and 40 respectively communicate with an interior chamber 126 and 128 in the interior of the valve housing 98 which chambers 126 and 128 communicate with openings 108 and 110 through apertures 130 and 132 in the valve members 100 and 102 respectively. This fuel and oxidizer may be supplied through the lines 32 and 40 to lines 65 and 67 leading to the fuel injectors 20, as diagrammatically illustrated by the arrows in FIG. 2, through the chambers 126 and 128, without mixing with the gas supplied to the chamber 120.

Cavitating venturi 134 and 136 are used in each of the fuel and oxidizer lines for each of the propellant valves for obtaining a metered flow of propellant which is dependent only on the upstream pressure and the diameter of said cavitating venturi which in conjunction with the propellant valves provides a metered flow that is independent of combustion chamber pressure. It should be understood however, that the pilot solenoid valves and the propellant valves illustrated in FIG. 2 are only for purposes of illustration and the invention is not intended to be limited to the specific embodiment of the valves shown therein.

In operation, an analog thrust demand signal is received by the digital computer 58 and is transmitted as a digital signal in proportion to the analog thrust demand signal. Assuming that an analog thrust demand signal is fed into the computer 58 which demands four-sevenths of the total thrust output of the rocket motor 10. The control signal C, FIG. 1, or line 66, FIG. 2, will be energized to provide a signal to the pilot solenoid valve 72, which will actuate the armature 76 to close off the opening 84 and the gas pressure in line 50 from the gas storage tank 16. The pressure in the chamber 120 of the propellant valve C, 96, will be vented to ambient pressure through the vent 88 in the pilot solenoid valve 72, and the propellant pressure acting on the bellows 112 and 114 will raise the valve members 100 and 102 in the propellant valve 96 to permit fuel to flow through the line 32 and oxidizer to flow through the line 40 out of respective discharge openings 108 and 110 to injectors 20 which are indicated as having a 57.1% flow area of the total flow area supplied by all the injectors. Thus, a thrust output will be provided in accordance with the amount of fuel and oxidizer flowing through the 57.1% flow area injectors and will be proportional to the analog thrust demand signal input.

As illustrated in FIG. 1, each of the pilot solenoid valves 68, 70 and 72 is connected to a propellant valve A, B or C associated therewith which propellant valves A, B or C are connected to injectors having a specific percentage of the total flow area. Thus pilot solenoid valve 68, FIG. 2, will be connected through propellant valve A to injectors having a 14.3% flow area and pilot solenoid valve 70 will be connected through propellant valve B to injectors having a 28.6% flow area to provide specific amounts or weight flow of fuel to the rocket motor 10 in accordance with a thrust demand signal activating each of the pilot solenoid valves 68 or 70. Additionally, a signal may be received in analog form to the digital computer 58 which can activate all of the control lines including control signal A, control signal B, and control signal C, FIG. 1, or lines 62, 64 and 66, FIG. 2, to give or actuate the three pilot solenoid valves 68, 70 and 72 simultaneously thereby activating their associated propellant valves A, B and C which will provide a 100% flow area or 100% thrust level.

It has been found that the number of obtainable thrust levels is equal to two (2) raised to the power of the number of pilot solenoid valves minus 1, $(2^n-1)$. In other words, combinations of the valves in combinations of two or more can also be obtained and it will be apparent that, in the embodiment illustrated, seven flow levels of propellants may be obtained in accordance with the formula $(2^n-1)$ where $n$ equals the number of pilot solenoid valves. For a four pilot solenoid valve system there will be provided $2^4$ minus 1, $(2^4-1)$, or 15 flow levels, etc. Thus, the number of obtainable flow levels or thrust levels may be expressed by the formula $(2^n-1)$.

From the above detailed description it will be seen that a relatively simple system is provided for obtaining specific levels of thrust output for a rocket motor. Since the system is essentially an off-on system as opposed to providing a variable annular valve area, the system will be highly reliable since it is insensitive to dirt which can effect the variable annular area in the continuous type system. The higher reliability of the present system is partly due to the use of simple solenoid valves rather than complex servo systems requiring feed-back controls as is true of the continuously variable types. Solenoid valves of the type used with the present invention are very common in rocket control systems and have received extensive testing for many years and have proven to be highly reliable. The system of the present invention will also be relatively lightweight due to the relatively lesser number of components required. It should be understood, however, that instead of using intermediate pneumatic or hydraulic pilot solenoid valves, as illustrated, direct actuated solenoid valves may be used to feed the injectors directly. Furthermore, the specific injector flow areas illustrated are only for purposes of description and it is not intended that the invention be limited to the values shown.

While the invention has been described in a preferred embodiment, it will be understood by those skilled in the art that various changes and modifications may be made therein without departing from the spirit and scope thereof. We aim in the appended claims to cover all such modifications.

We claim:

1. A fuel control system for controlling the thrust output of a rocket engine or the like comprising: fuel injector means including a plurality of fixed area fuel injector openings for supplying fuel to the combustion zone of said engine, at least some of said openings having a different flow area size than other of said openings; valve means for opening and closing said fuel injector openings, there being one such valve means associated with each size flow area opening, each said valve means being responsive to predetermined thrust demand signals for opening its associated flow area injector opening such that for each thrust demand signal a corresponding fuel injector opening will be selected for producing a level of fuel flow in accordance with the thrust demand signal, and said valve means and said fuel injector area openings being so related that a number of fuel flow levels are provided with the number of fuel flow levels varying in accordance with the formula $(2^n-1)$, where $n$ equals the number of said valve means.

2. A fuel control system as recited in claim 1 further comprising control means for generating control signals in accordance with a fuel flow level demand input, said control signals being respectively connected to each said valve means for actuating said valve means to open a fuel injector flow area thereby providing a flow of fuel for producing a thrust level in response to the demand input.

3. A fuel control system as recited in claim 2 wherein said control means includes means for converting analog thrust demand input signals into digital control output signals proportional to said analog input signals, and each said valve means being responsive to specific values of said digital control output signals such that only those fuel injector flow area openings will be opened which are associated with a valve means responsive to specific thrust demand signals.

4. A fuel control system for controlling the thrust output of a rocket engine or the like including a liquid fuel stored under pressure and means for injecting the fuel into the combustion zone of said engine, said fuel control system comprising: a plurality of fuel injectors disposed for injecting fuel into the combustion zone of said engine, said fuel injectors having predetermined different size flow areas from one another with the thrust output level of said engine varying in proportion to the fuel supplied through the flow areas of said fuel injectors; fuel valve means connected to said fuel injectors for controlling the supply of fuel thereto, there being one fuel valve means associated with each size flow area fuel injector; pilot valve means respectively connected to said fuel valve means, with one pilot valve means being respectively associated with each said fuel valve means for opening and closing its associated fuel valve means, each said pilot valve means being responsive to a thrust demand signal for opening or closing its associated fuel valve means in accordance with the level of thrust output determined by the thrust demand signal such that fuel will be supplied to the engine combustion zone through the fuel injector flow area associated with said pilot valve means responsive to the thrust demand signal.

5. A fuel control system as recited in claim 4 wherein each said fuel valve means and its associated pilot valve means are respectively connected through a source of fluid pressure, said pilot valve means being responsive to open or close the fluid pressure to said fuel valve means and said fuel valve means being responsive to changes in the fluid pressure such that when the fluid pressure is closed by said pilot valve means said fuel valve means will open for supplying fuel to its associated fuel injector flow area and when the fluid pressure is opened by said pilot valve means said valve means will close the supply of fuel to its associated fuel injector flow area.

6. A fuel control system as recited in claim 5 wherein each said pilot valve means comprises a solenoid valve; and control means for generating control signals in proportion to a thrust demand signal input with said control means being connected to each said pilot valve means and each pilot valve means being responsive to only specific control signals from said control means for actuating said pilot valve means such that only the fuel valve means associated with the pilot valve means responsive to particular control signals will be opened for regulating the fuel flow level in accordance with the thrust demand signal.

7. A fuel control system as recited in claim 4 wherein the number of levels of thrust output of said engine is determined by the formula $(2^n-1)$ wherein $n$ equals the number of pilot valve means provided for said fuel injector flow areas.

8. A fuel control system as recited in claim 4 wherein the fuel for said engine comprises first and second hypergolic fuels and each fuel valve means including means for separately supplying each of said first and second hypergolic fuels to its associated fuel injector flow area.

9. A fuel control system for use in aircraft for controlling the thrust output of the aircraft engine comprising: a plurality of different size orifices disposed for supplying fuel to the engine combustion zone, each of said orifices having a predetermined flow area such that the flow of fuel supplied to the engine combustion zone will be controlled in accordance with the flow area of said orifices; valve means for selectively opening and closing said orifices, there being one valve means provided for each size of said orifices; and control means for selectively activating said valve means such that a selective number of flow areas may be obtained to produce different levels of fuel flow by selectively opening or closing said orifices, with the number of different attainable fuel flow levels being in accordance with the formula $(2^n-1)$ wherein $n$ equals the number of valve means provided for each size of said orifices.

References Cited by the Examiner

UNITED STATES PATENTS

| | | | |
|---|---|---|---|
| 2,229,903 | 1/1941 | Schmohl | 137—599 |
| 2,627,280 | 2/1953 | Adelson | 137—599 |
| 2,814,929 | 12/1957 | Morley et al. | 60—240 |
| 3,137,130 | 6/1964 | Tinkelenberg | 60—258 |

MARK NEWMAN, *Primary Examiner.*

D. HART, *Assistant Examiner.*